(12) United States Patent
Recker et al.

(10) Patent No.: US 6,845,309 B2
(45) Date of Patent: Jan. 18, 2005

(54) ELECTRIC POWER ASSIST TORQUE CHECK

(75) Inventors: Darrel A. Recker, Ypsilanti, MI (US); Dale C. Killins, Detroit, MI (US); Ashraf A. Zeid, Troy, MI (US); Robert A. Stopper, Jr., Plymouth, MI (US)

(73) Assignee: Visteon Global Technologies, Inc., Dearborn, MI (US)

( * ) Notice: Subject to any disclaimer, the term of this patent is extended or adjusted under 35 U.S.C. 154(b) by 232 days.

(21) Appl. No.: 10/066,214

(22) Filed: Jan. 30, 2002

(65) Prior Publication Data

US 2003/0144780 A1 Jul. 31, 2003

(51) Int. Cl.$^7$ ............................................. G06F 7/00
(52) U.S. Cl. ...................... 701/41; 180/402; 180/422
(58) Field of Search .............................. 701/41, 43, 80; 180/402, 404, 407, 421, 422, 78, 400, 410

(56) References Cited

U.S. PATENT DOCUMENTS

| | | | |
|---|---|---|---|
| 4,660,671 A | 4/1987 | Behr et al. .................. 180/142 |
| 4,685,528 A | 8/1987 | Suzuki et al. .............. 180/79.1 |
| 4,793,431 A | 12/1988 | Eto et al. .................... 180/142 |
| 4,800,974 A | 1/1989 | Wand et al. ............... 180/79.1 |
| 4,869,334 A | 9/1989 | Marumoto et al. ......... 180/79.1 |
| 4,972,133 A | 11/1990 | Hirota et al. ............... 318/646 |
| 5,039,926 A | 8/1991 | Morishita et al. .......... 318/434 |
| 5,253,725 A * | 10/1993 | Nishimoto .................. 180/446 |
| 5,257,828 A | 11/1993 | Miller et al. ............... 180/79.1 |
| 5,475,289 A | 12/1995 | McLaughlin et al. ....... 318/432 |
| 5,504,403 A | 4/1996 | McLaughlin ................ 318/432 |
| 5,541,841 A * | 7/1996 | Tanaka ........................ 701/41 |
| 5,568,389 A | 10/1996 | McLaughlin et al. .. 364/424.05 |
| 5,612,877 A | 3/1997 | Shimizu et al. ....... 364/424.051 |
| 5,743,351 A | 4/1998 | McLaughlin ................ 180/446 |
| 5,761,627 A | 6/1998 | Seidel et al. .................. 701/41 |
| 5,765,116 A * | 6/1998 | Wilson-Jones et al. ....... 701/41 |
| 5,861,725 A | 1/1999 | Endo et al. .................. 318/434 |
| 5,913,375 A * | 6/1999 | Nishikawa .................. 180/168 |
| 5,913,913 A | 6/1999 | Okanoue et al. .............. 701/41 |
| 5,984,042 A * | 11/1999 | Nishimoto et al. ......... 180/446 |
| 6,039,144 A | 3/2000 | Chandy et al. ............. 180/446 |
| 6,082,482 A * | 7/2000 | Kato et al. .................. 180/402 |
| 6,107,767 A | 8/2000 | Lu et al. ..................... 318/561 |
| 6,122,845 A * | 9/2000 | Menghi ...................... 36/50.1 |
| 6,134,491 A | 10/2000 | Kawagoe et al. ............. 701/43 |
| 6,178,365 B1 | 1/2001 | Kawagoe et al. ............. 701/41 |
| 6,360,151 B1 * | 3/2002 | Suzuki et al. ................. 701/41 |
| 6,364,051 B1 * | 4/2002 | Kada et al. ................. 180/446 |
| 6,370,459 B1 * | 4/2002 | Phillips ....................... 701/41 |
| 6,427,104 B1 * | 7/2002 | Matsushita et al. ........... 701/41 |
| 6,450,287 B1 * | 9/2002 | Kurishige et al. .......... 180/446 |
| 6,459,971 B1 * | 10/2002 | Kurishige et al. ............ 701/41 |
| 6,499,559 B2 * | 12/2002 | Mc Cann et al. ........... 180/446 |
| 2001/0016793 A1 | 8/2001 | Ikemoto ...................... 701/41 |

* cited by examiner

*Primary Examiner*—William A. Cuchlinski, Jr.
*Assistant Examiner*—Olga Hernandez
(74) *Attorney, Agent, or Firm*—Brinks Hofer Gilson & Lione (57) ABSTRACT

A power steering system includes at least one motor to assist the operator of a vehicle in turning the wheels and steering the vehicle and at least one computer or microprocessor controller. One of the processors adjusts the motor assist torque to reduce the driver effort based on specified requirements defined by boost curves. A second microprocessor controller uses an algorithm to calculate the output of the power steering motor, and compare the relationship between the driver torque and the power assist torque. If the relationship between the two is out of specified bounds, then the power steering assist is deemed inappropriate and the power system may go to a power-off state to assure that the motor does not generate an undesirable torque that has not been requested by the driver.

18 Claims, 8 Drawing Sheets

ELECTRIC POWER ASSIST TORQUE CHECK

FIELD OF THE INVENTION

The present invention relates to power steering systems, and in particular to a power steering system using torque feedback to insure that the power assist mechanism output stays within prescribed operating bounds.

BACKGROUND OF THE INVENTION

Failsafe control of power transmission and torque is a continuing problem in many fields of application. An application of significant importance to automotive chassis controls is the operation of power steering systems in motor vehicles, where the power steering assist is an integral part of modern driving equipment. Power steering is highly useful when making sharp turns at slow speeds or in parking an automobile. In such situations, a steering effort by the driver must be matched with a greater effort by the power steering mechanism. Too-little assist effort from the power steering, requiring strenuous effort by the driver to maneuver or park, is unsatisfactory.

An opposite situation is encountered in high-speed freeway driving, where a driver is able to steer manually with virtually no assistance from the power steering assist mechanism. The power steering mechanism must "know" that greater effort is required in the parking situation, in order for the power steering assist mechanism to assist the driver. In the second situation, however, any excessive assist by the power steering mechanism would not be helpful, since the driver can easily maneuver and control the vehicle without assistance. Of course, the assistance is in the direction of the driver's effort so that the assist mechanism is not fighting the driver.

One problem with power steering systems is controlling the amount and direction of output by the assist mechanism in response to the driver steering input. Driver steering input is relatively easy to measure, using a torsion bar across input and output steering shafts and a Hall effect sensor in the steering column of an automobile or truck, as disclosed in U.S. Pat. No. 6,107,767. Power output by the assist mechanism, however, has been difficult to quantify in a cost-effective way. In U.S. Pat. Appl. Publ. US2001/0016793, published Aug. 23, 2001, for instance, there is no attempt to measure assist mechanism torque directly, but rather the steering correction depends on a series of calculations involving vehicle speed, deceleration, and increases or decreases in driver torque effort. U.S. Pat. No. 5,257,828 uses motor speed and yaw rate to control steering assistance, rather than trying to measure torque directly. U.S. Pat. No. 5,504,403 uses a driver torque signal and a series of closed-loop feedback calculations involving gain control to minimize feedback times and eliminate sluggishness in the steering assist. There is no attempt to measure and thus directly control the output torque of the steering assist mechanism. Thus, it may require a greater amount of time for the assist mechanism to respond to the driver.

What is needed is a better system and method for monitoring the effective output of a power steering assist mechanism in relation to the steering effort by the vehicle operator, to make sure that the assist is within reasonable bounds for a desirable level of steering assist and that it if it exceeds these bounds due to a system malfunction, it brings the system to a safe, limited function operating state.

BRIEF SUMMARY OF THE INVENTION

The present invention meets this and other needs with a power steering system that uses an algorithm to calculate output torque of an assist mechanism from a power steering system. The controller then compares the assist mechanism output with the operator steering torque to determine whether the relationship between the two is appropriate. One embodiment of the invention is a power steering system having an assist mechanism with at least one motor for power steering. The power steering system also comprises a sensor for sensing at least one of a steering angle and a steering torque by a driver of the vehicle. There is also at least one controller receiving inputs from the sensor and the motor. The controller calculates an output torque of the assist mechanism and then compares the output torque with the steering torque applied by the driver. The controller uses an algorithm to calculate the output torque by the assist mechanism and determines whether a relationship between the steering wheel torque sensor output and the calculated motor torque output for the assist mechanism is within acceptable bounds for a desirable level of steering assist.

Another embodiment is a method for controlling power steering. The method comprises providing a power steering system for a vehicle selected from the group consisting of an automobile and a truck. The method then includes measuring a steering torque by a driver of the vehicle and measuring an output torque of the power steering system using an algorithm. The method then compares the output torque of the steering system with the steering torque by the driver, and adjusts the output of the power steering system if a relationship between the efforts does not meet specified criteria.

Many other embodiments of the invention are meant to be included, as will be seen in the accompanying drawings and descriptions.

DETAILED DESCRIPTION OF THE PRESENTLY PREFERRED EMBODIMENTS OF THE INVENTION

Figure 1:
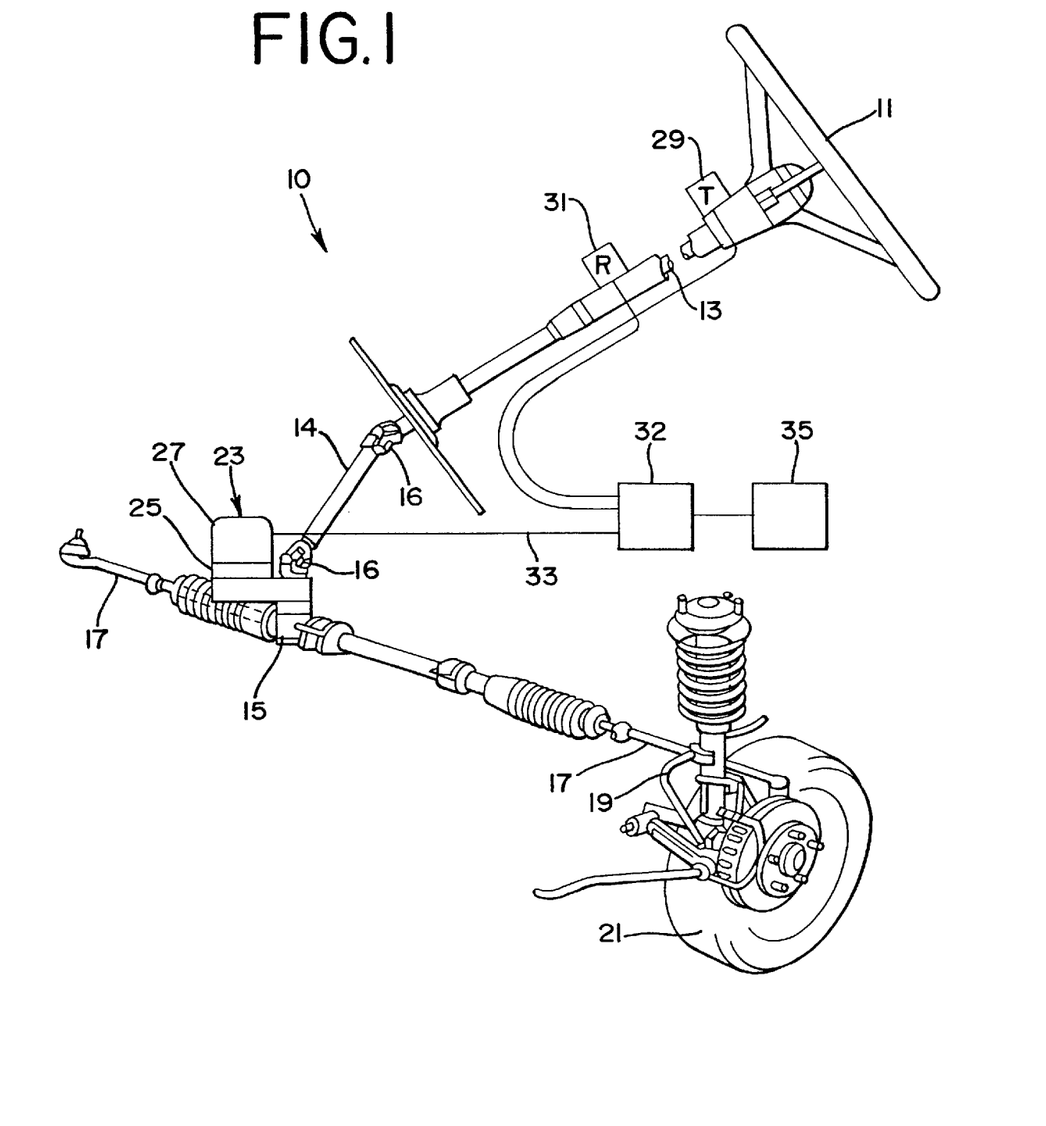
FIG. 1 is an isometric view of a power steering apparatus using an electric motor, the apparatus suitable for an automobile or a truck and providing an environment suitable for the present invention.

FIG. 1 depicts a steering apparatus 10 for a motor vehicle, such as an automobile or a truck. A driver (not shown) steers the vehicle with a steering wheel 11 mounted on first steering shaft 13. The vehicle may have a second steering shaft 14 that connects to a rack-and-pinion mechanism 15. The connections between the first and second shafts and the second shaft and the rack-and-pinion mechanism may be made by universal joints 16. Rotations of the steering wheel by the driver will be transmitted through the steering shafts and the universal joints to the rack and pinion mechanism. The rack and pinion mechanism then moves tie rods 17 through steering knuckles 19 (only one shown) to steer wheels 21 (only one shown). The steering is assisted by motor 23 in response to torque sensor 29 and rotation sensor 31. Motor controller 32 receives inputs from the sensors 29, 31 and instructs the motor 23 to assist in power steering. In addition, in this embodiment, the controller may also function as a power supply for the three-phase motor 23, monitoring the power, motor angle and phase currents drawn by the windings of the motor as it operates to power the steering of the vehicle. Preferably, a separate, independent controller 35 is in communication with motor controller 32 to receive information concerning sensor signals and motor operating parameters. Controller 35 uses an algorithm for determining whether the motor is or is not assisting the driver in an appropriate manner for a desirable level of steering assist.

Figure 2:
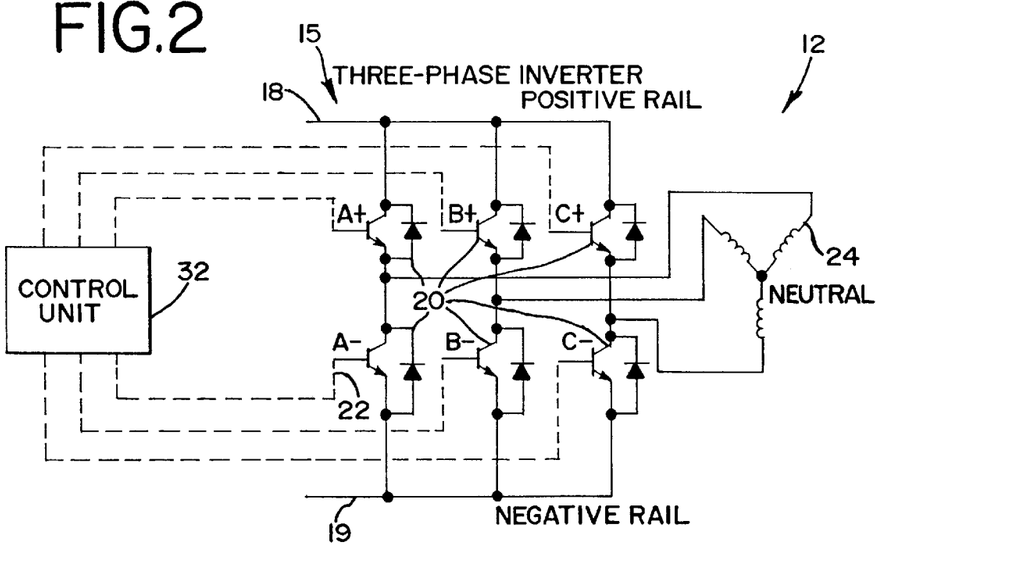
FIG. 2 is a power supply suitable for a motor used in the embodiment of FIG. 1.

In one embodiment, as shown in FIG. 2, the motor 23 comprises a 3-phase wound stator 24 and a "brushless DC" rotor, that is a permanent-magnet rotor without windings (not shown). The motor is powered by a three-phase, 6-FET (Field Effect Transistor) bridge 15, including 6 FETs 20 controlled by their gates 22 and gate drives (not shown) within motor controller 32. The bridge is powered by positive rail 18 and negative rail 19 from 12V, 42V, or other levels of vehicle system voltage battery power. The motor may be operated in a Space Vector Modulation (SVM) manner and run at electrical power frequencies of up to approximately 500 Hz. In other embodiments, the motor may be controlled via triangular wave modulation, or other method of pulse width modulation (PWM). The currents drawn by the phases of the motor are constantly monitored.

An algorithm is used to calculate the motor torque of the motor. For a brushless DC motor controlled by SVM, the algorithm for calculating motor assist torque, is calculated by the following equation:

$$\text{Torque} = sqrt(\tfrac{2}{3}) * Kt2 * [I_a * \sin(\Theta) + I_b * \sin(\Theta - 2\pi/3) + I_c * \sin(\Theta + 2\pi/3)],$$

where Kt2 is a constant torque factor for a particular motor having units of N-m/amp, $I_a$, $I_b$ and $I_c$ are motor phase currents, and $\Theta$ is defined as the motor electrical angle, which is equivalent to the rotor mechanical angle times the number of pole pairs of the motor. The motor angle may be measured using an encoder or a resolver.

Other, equivalent formulae may be derived using motor properties, such as $I_a + I_b + I_c = 0$, and trigonometric properties and identities, so that motor torque=

$$sqrt(2) * Kt2 * [I_a * \sin(\Theta + 2\pi/3) + I_b * \sin(\Theta)],$$

where Kt2 and $I_a$, $I_b$, and $\Theta$ are defined as above. All such formulae involving trigonometric or other equivalents for calculating motor torque, or approximations, are meant to be included in the present invention.

The algorithm is updated for currents, rotor position, and motor angles at a rate of about 1 kHz. The motor may be a 2-pole motor or a 4-pole motor, for which the number of pole pairs would be 1 and 2 respectively. Motors with other numbers of pole pairs may be used.

Torque from the operator or driver of the vehicle is estimated from a relative angular deflection sensor generating a torque signal, as depicted in FIG. 1, or other torque sensor. One embodiment is a torsion bar and a Hall effect sensor. Preferably, the torque measured for the operator should be independent of the power steering assist mechanism that is used in any particular embodiment of a power steering system. The operator's torque is then used to look up acceptable upper and lower limits of motor torque at any given time. The controller 35 then signals whether the motor torque is out of limits, i.e., higher than a value given for an upper boost limit or lower than a limit given for a lower boost limit. If the motor torque is out of these limits, the signal is then checked or qualified to make sure that this is not a spurious excursion. One method of checking or qualifying is to count up when these bounds are exceeded and count down but not lower than zero when within these bounds, for a specific time period. If the count exceeds a specific threshold for a given time period, it can then be established that this is a properly diagnosed failure of the power assist steering system. This qualified failure is then passed to the motor controller or other system elements capable of disabling the assist mechanism, to shut off power to the power steering motor and revert to manual steering. In addition to shutting off the power steering motor, the output of the steering assist may be adjusted to a very low level of output for a period of time, such as one-tenth of the previous torque for 5–10 milliseconds. If the motor torque remains at an unacceptable level, the output may be further reduced or shut off, as appropriate.

Figure 3A:
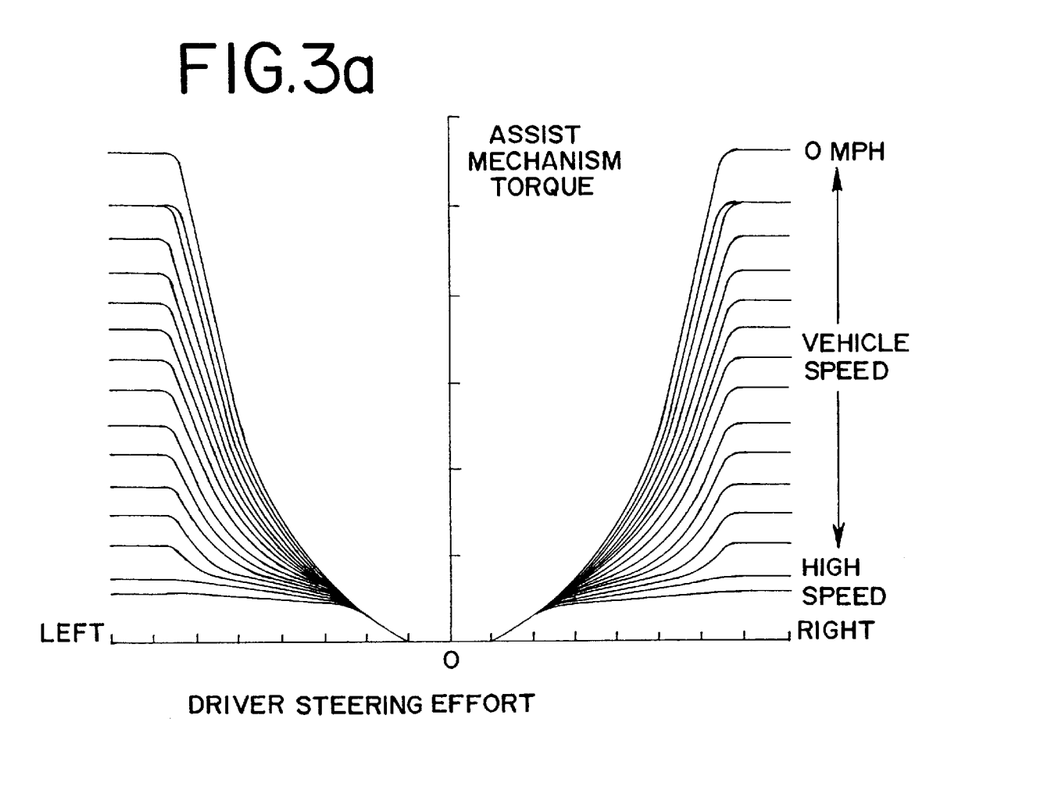
FIGS. 3a and 3b are examples of tables of torques useful for estimating appropriate values for power assist output with regard to operator steering effort and vehicle speed.

FIG. 3a contains "boost curves" of torque values, left and right, that are desirable for steering the vehicle, depending on vehicle speed. Each curve or line represents a range of values for torques that are acceptable for a particular speed and for a particular level of driver steering torque. For a particular vehicle, a steering effort of about 6–8 N-m may be appropriate for parking maneuvers, while high speed turns should require no more than 3 N-m of torque. This table, or another table appropriate for a particular vehicle, may be used to generate a look-up table of minimum and maximum values for the controller of the power steering system.

Figure 3B:
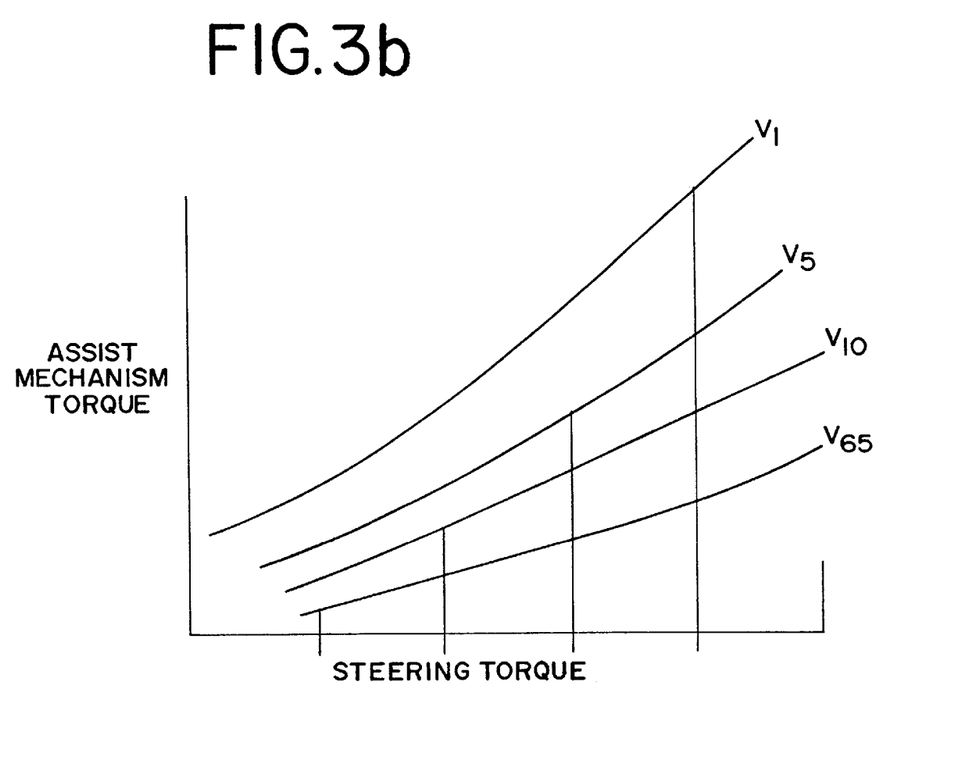

FIG. 3b is another table of torque values, i.e., a graph of an optimal motor assist torque for a given speed and operator steering torques. A range of acceptable torque values and a look-up table stored in the controller may be constructed from this graph by any useful or effective method. In one example, acceptable torque values may be the indicated torque value for a given speed, e.g., 2 N-m, ±25% or ±10%. The controller compares the motor assist torque value derived from the currents and phase angles with the value from the look-up table. If the motor assist torque is outside the specified range, then the controller may signal another controller in the vehicle for instructions or may itself send a signal to the motor to shut down.

Figure 4:
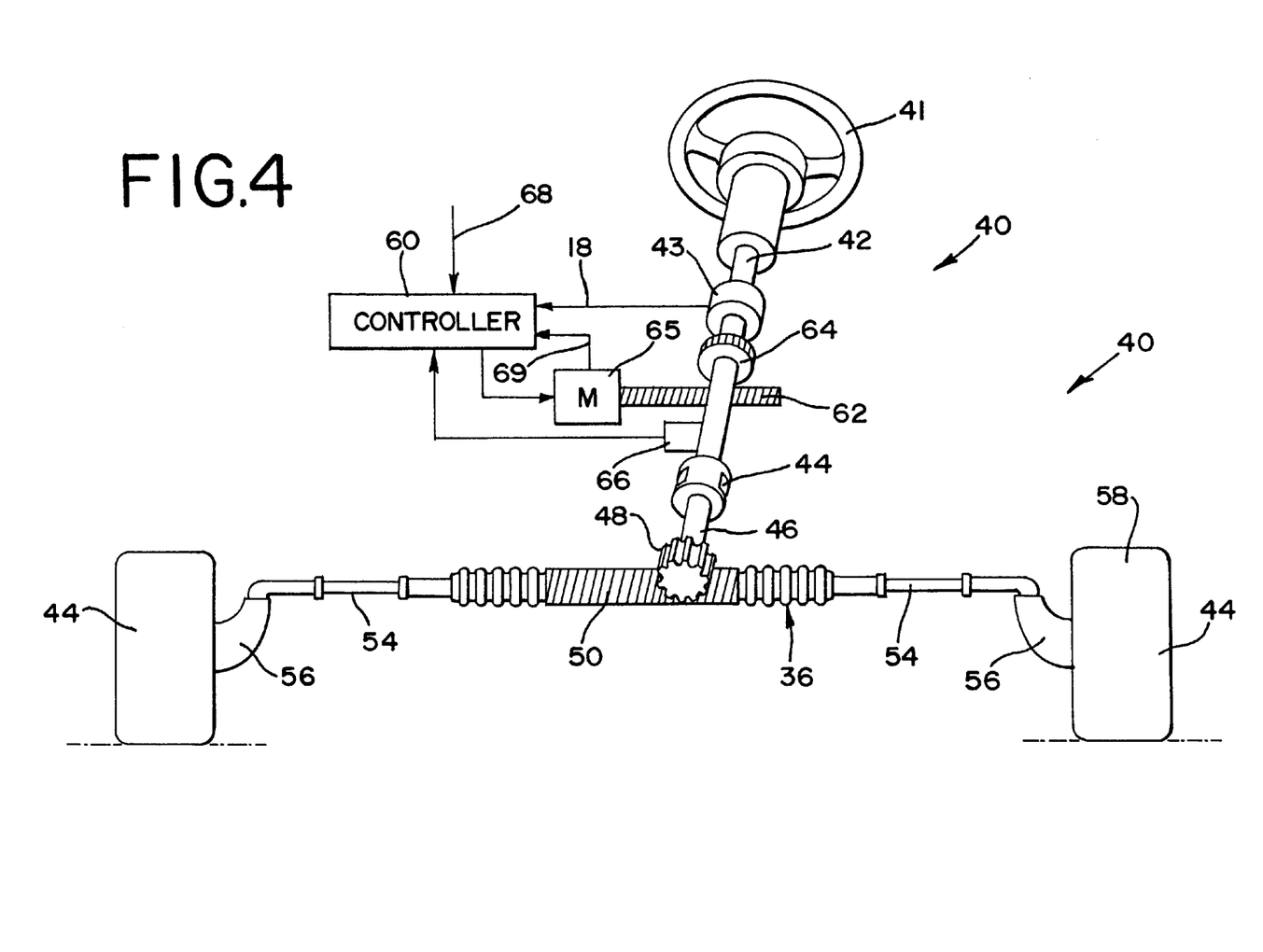
FIG. 4 is a schematic view of an alternative embodiment of a power steering apparatus using an electric motor and a separate rack-and-pinion.

FIG. 4 is another embodiment of a power steering system 40 for a vehicle. In this embodiment, the driver rotates the steering wheel 41 and first shaft 42 through universal joint 44 and second shaft 46. The second shaft 46 ends in a pinion gear 48 and rack 50 of a rack and pinion steering mechanism 52. As rack 50 moves linearly left or right, it moves tie rods 54 and steering knuckles 56 to turn and guide vehicle wheels 58. In this embodiment, the first shaft 42 mounts a torque sensor 43 that outputs a signal to controller 60. Second rack 62 mounts to the second shaft 46 via pinion 64 for controlling steering by motor 65, responsive to controller 60. The second shaft 46 also mounts rotational position sensor 66 that sends a signal indicative of the steering wheel angle to controller 60. Controller 60 may have other inputs 68 from other sensors useful in calculating whether to assist with power steering or to cease to assist. Controller 60 sends and receives signals 69 to and from motor 65, including current drawn by each phase of the motor and the rotational position of the rotor.

Figure 5:
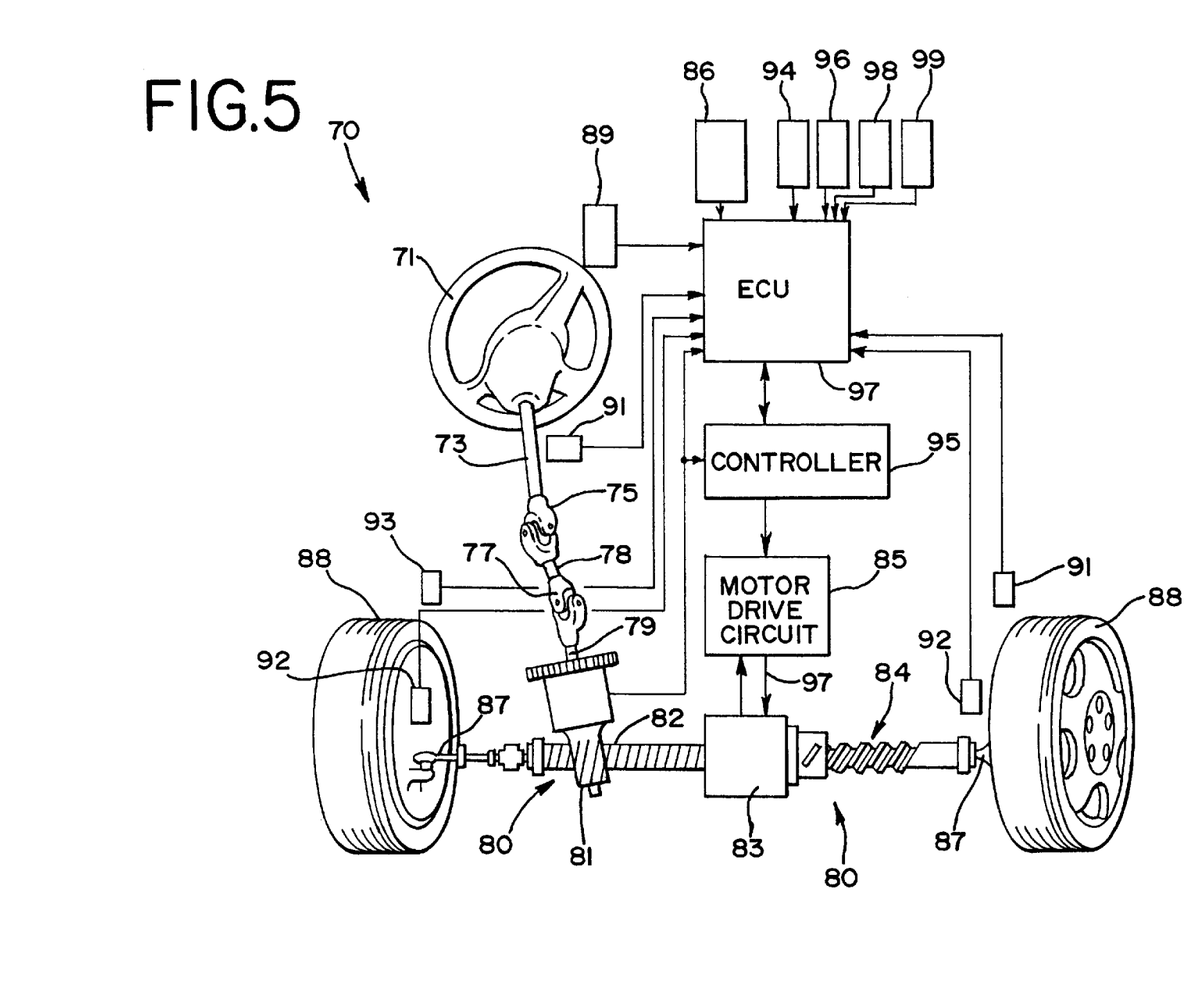
FIG. 5 is a schematic view of another alternative embodiment using a ballscrew and ballscrew motor for power assisted steering.

FIG. 5 is yet another embodiment of a vehicle steering system 70 embodying the present invention. Steering wheel 71 connects to rack-and-pinion steering mechanism 80 through first and second shafts 73, 78 and universal joints 75, 77. Pinion 79 at the end of second shaft 78 and universal joint 77 meshably mounts to rack 82 for converting the rotary motion of the steering wheel 71 into linear motion of the rack 82. Rack 82 also includes a ballscrew 84 driven by an electric motor 85 in response to controller 95. The rack 82 and ballscrew connect through tie-rods 87 to two steered wheels 88.

The steering system also preferably includes steering angle sensor 89, steering wheel torque sensor 91, wheel speed sensors 92, and vehicle height sensors 93. Sensors 89, 91, 92 and 93 may send signals indicative of their respective parameters to controller 95 or vehicle electronic control unit 97. Motor drive circuit 85 controls the motion of the ballscrew 84, as it turns the wheels left or right as requested by the driver of the vehicle. Motor drive circuit 85 is in controllable communication with controller 95, and is in communication with the motor 83 that drives the ballscrew. The motor drive circuit keeps track of the rotational position of the ballscrew motor and linear position of the ballscrew itself, as well as electrical parameters of motor and ballscrew performance, including, but not limited to, the motor mechanical angle and currents for the phases of the motor. This information may be reported to the controller 95 for calculation of the algorithm to determine whether to continue to assist in power steering by the motor and the ballscrew in response to driver inputs on the steering wheel and derived inputs from the various sensors. Other sensors on the vehicle and sensor inputs to the controller may include, but are not limited to, a vehicle speed sensor 86, a vehicle yaw angle and yaw rate sensor 94, a brake pedal displacement sensor 96, a brake pedal force sensor 98, and at least one accelerometer 99 for measuring an acceleration or a deceleration of the vehicle.

Figure 6:
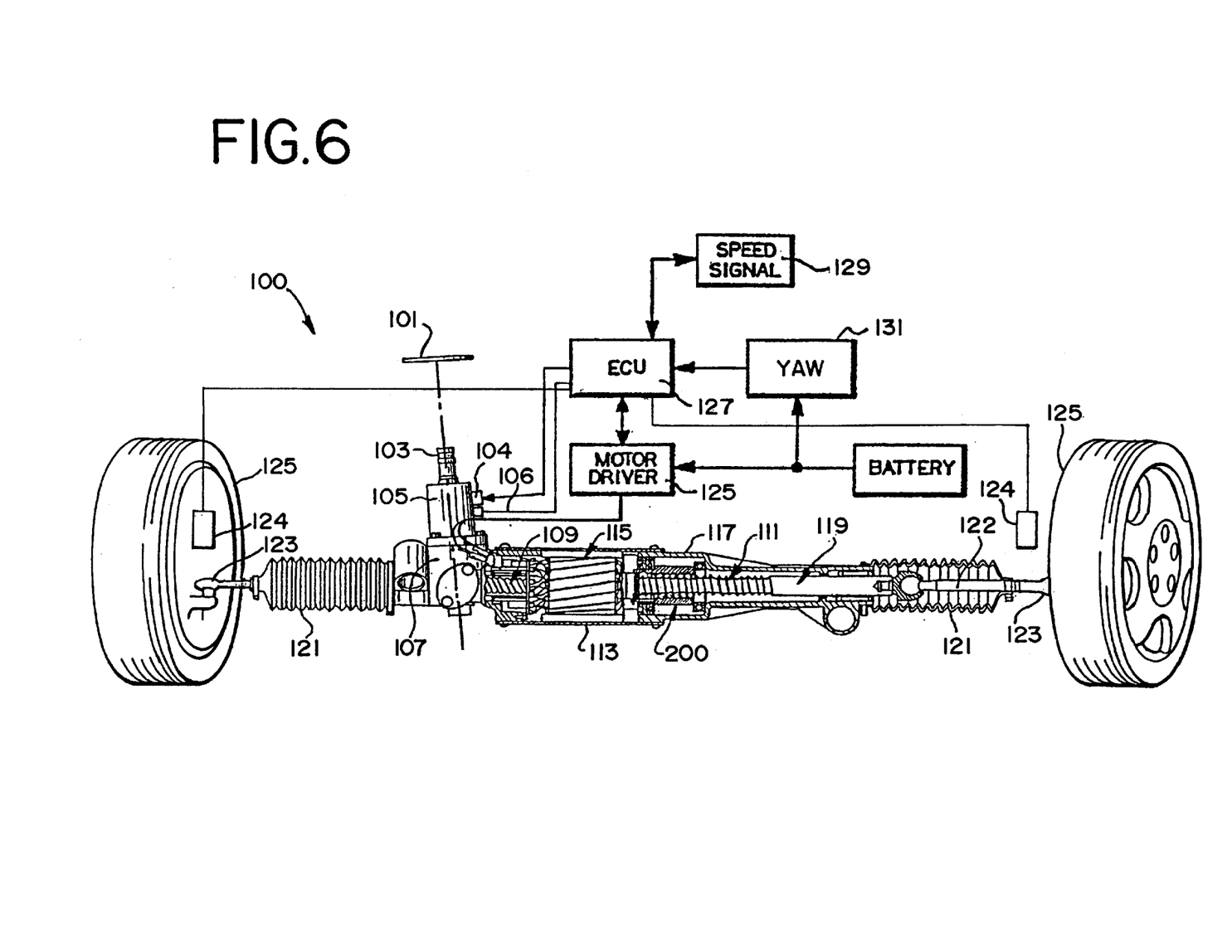
FIG. 6 is an alternate view of the embodiment of FIG. 5 depicting the power steering mechanism and its control system.

FIG. 6 is another embodiment of a vehicle steering system 100 using a ballscrew for power steering assistance to a rack-and-pinion steering mechanism. Steering wheel 101 mounts to input shaft 103 which connects to pinion tower 105 and pinion 107. Rack 109 connects to a pinion 107 in the normal manner, and converts rotary motion of the pinion 107 to linear motion of the rack 109 via ballscrew 111. The input shaft 103 is a torsion shaft that deflects in torsion when twisted by a driver steering using the shaft. The shaft is put into torsion by the twisting motion of the driver at a near end of the shaft because the shaft is restrained at a distal end by the pinion gear. This torsion may be measured by several methods, including a Hall effect sensor 104 adjacent the input shaft, and communicating a signal indicative of the torsion to controller 127. The torsion is indicative of the effort by the driver in making a steering maneuver, while position sensor 106, also communicating with controller 127, may be a rotary encoder or other sensor capable of measuring and reporting to the controller the steering angle of the steering wheel.

Rack 109 causes steering members 119 (one shown) and tie rods 122 (one shown) within dust boots 121 to steer two steered wheels 125 though steering knuckles 123. Wheel speed sensors 124 send signals to controller 127. Ballscrew 111 is powered by motor driver 125 through stator 113 driving armature 115, which is mounted to the ballscrew 111. Motor driver 125 may include a power supply and power converter for the ballscrew motor, and the motor driver reports to the motor controller 127 signals and parameters indicative of motor and power steering performance, including phase angles, phase currents, rotor position, and the like. Other inputs to the controller may include signals indicative of a vehicle speed 129, and other signals useful to the controller or the operator, including, but not limited to, a vehicle yaw angle 131, a vehicle yaw rate, a vehicle acceleration, a vehicle deceleration, and a temperature.

Figure 7:
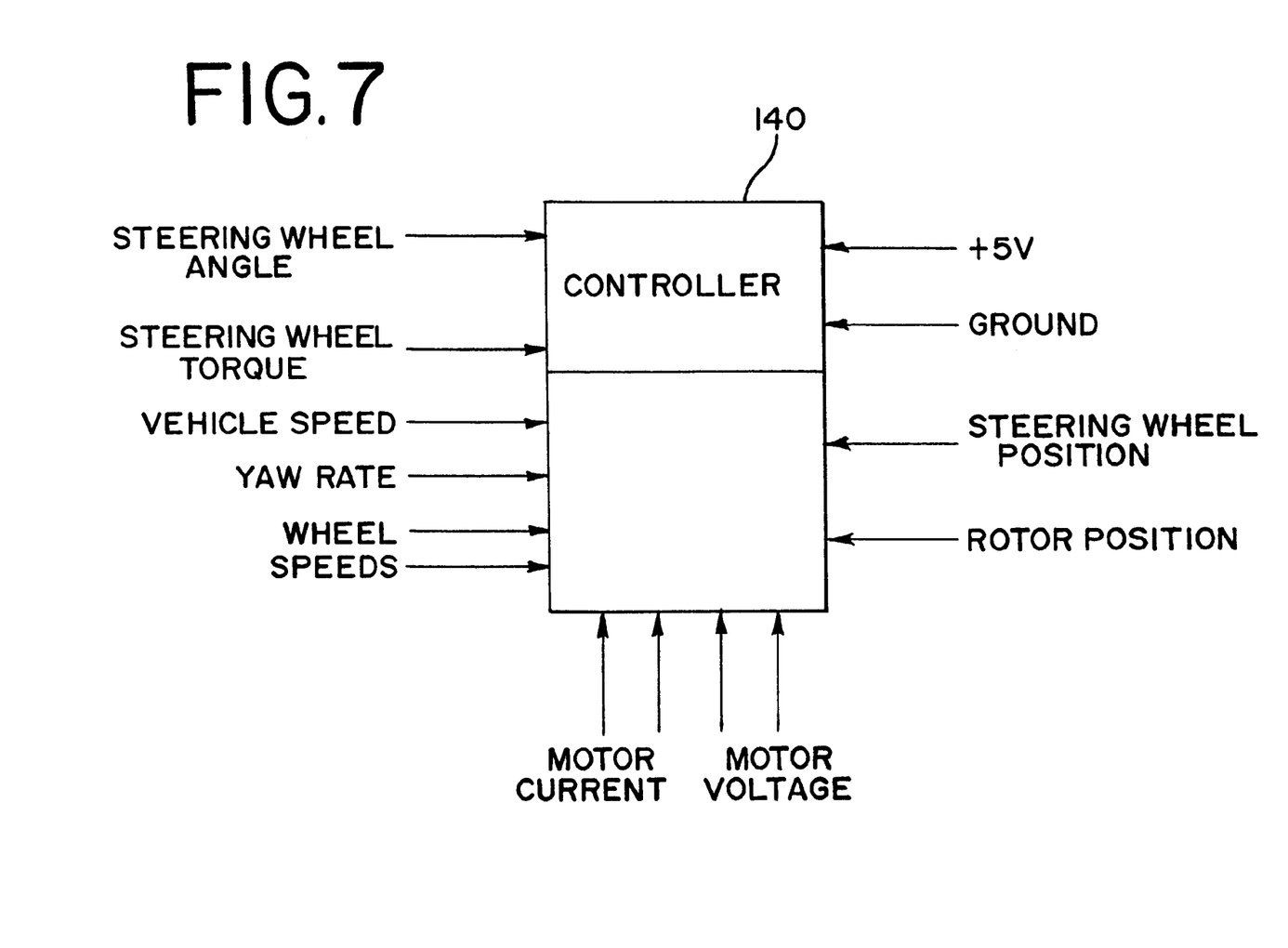
FIG. 7 is a control system for an electric power assisted steering apparatus.

FIG. 7 is a schematic representation of a controller 140 useful for the present invention. The controller may be any microprocessor or integrated circuit, or subsection thereof, capable of receiving the sensor signals discussed above, and calculating the expected torque and receiving or calculating a value for the steering wheel torque, and comparing it to a table of values. The controller then compares the value expected and decides whether the torque limit is out-of-limits, and therefore whether power steering assistance to the driver should be interrupted. The controller may be a microprocessor controller, a digital signal processor, an application-specific integrated circuit programmed with the appropriate formula and look-up table. The signals provided to the controller preferably include steering wheel angle and torque, motor current and motor position for the power assist portion of the power steering function of the vehicle, steering rotational position, vehicle wheel speeds, vehicle speed, yaw angle and yaw rate, and vehicle acceleration and deceleration, as well as a temperature.

Figure 8:
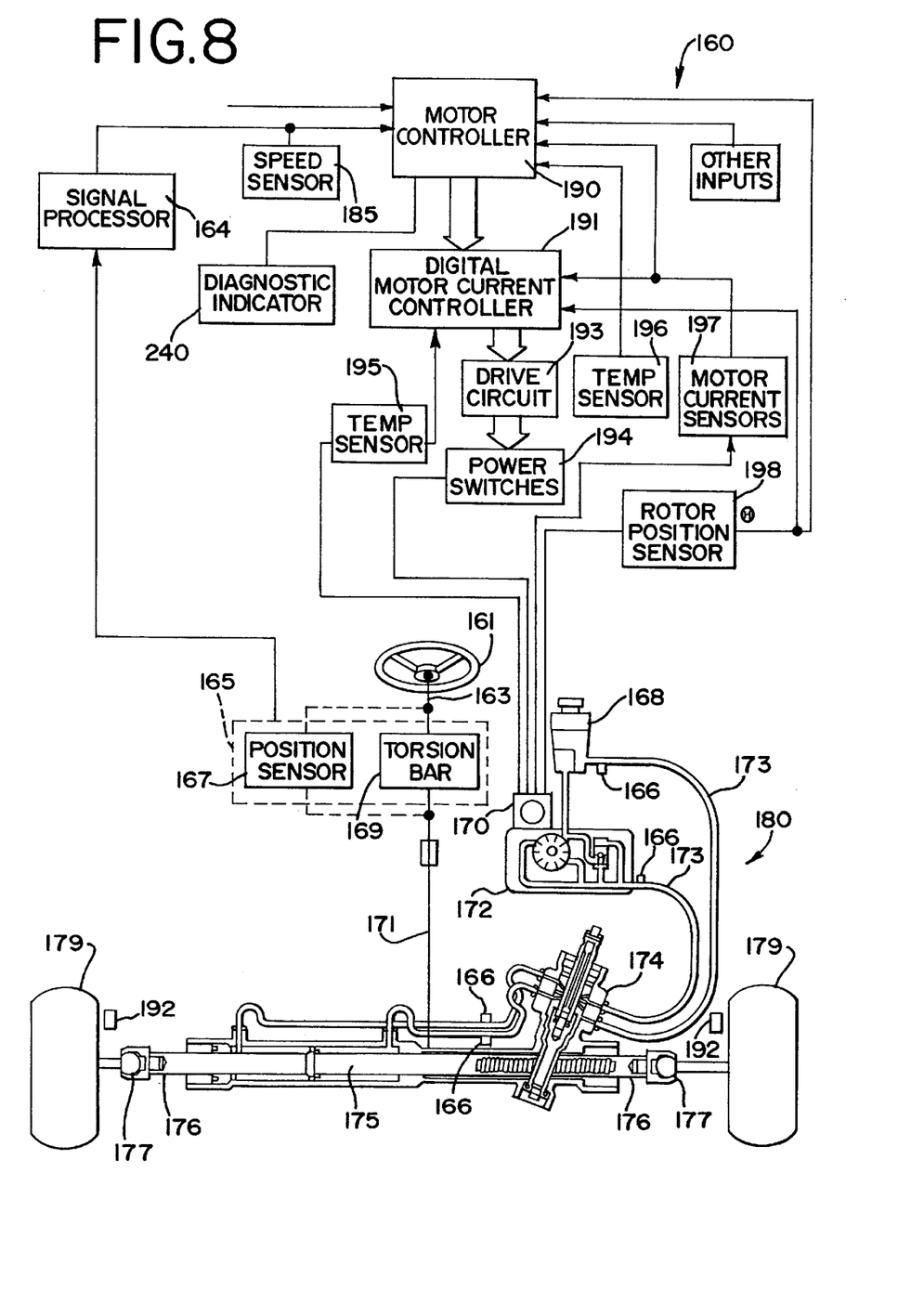
FIG. 8 is a schematic view of a control system for a hydraulic power assisted steering apparatus suitable for an automobile or a truck.

FIG. 8 is an active hydraulic-assist power steering system 160 embodying the present invention. Power steering system 160 includes steering wheel 161, steering input shaft 163 and output shaft 171, and torque sensor 165. Torque sensor 165 comprises position sensor 167 for measuring a position of input shaft 163 relative to output shaft 171, and torsion bar 169 for measuring a torque applied by the driver to the steering wheel. The output of the torque sensor may be sent to controller 190 or to a signal processor 164 for conditioning before it is sent to controller 190. The hydraulic system 180 includes a motor 170 controlled by motor controller 191. The motor controller may also utilize a motor drive circuit 93 and power switches 194 for driving the motor. Motor 170 powers hydraulic pump assembly 172 providing hydraulic power to steering assist control valve 174 through output and return lines 173. The steering assist control valve 174 reacts to operator steering torque to route steering cylinder 175 to the left or to the right as needed, moving through tie rods 176 and steering knuckles 177 to turn the vehicle wheels 179. Pressure sensors 166 are preferably placed in several positions in the hydraulic system 180 to sense pump outlet pressure, pump return pressure and left and right control valve pressures. In this embodiment, the pressure sensors may be used to measure the force that the assist mechanism is applying to the steering system instead of using the torque applied by an electric motor.

The hydraulic power steering system may also include other components, including a vehicle speed sensor 185, wheel speed sensors 192, motor temperature sensor 195, ambient temperature sensor 196, motor current sensors 197, and motor rotor position sensor 198. The motor current sensors preferably are used to derive phase angles as well as currents for each phase of the hydraulic motor. In a preferred embodiment, the motor 170 has a "brushless DC" rotor, that is, a permanent magnet rotor, and a stator with a plurality of phases, such as a 3-phase, 4-phase or 5-phase motor. The motor, as stated above, is driven by drive circuit 193 and power switches 194. The drive circuit 193 may include gate drives and other circuitry necessary for any desired mode of operation of the motor.

While this invention has been shown and described in connection with the preferred embodiments, it is apparent that certain changes and modifications, in addition to those mentioned above, may be made from the basic features of this invention. For example, two motors may be used in a power steering system, perhaps one to steer left and one to steer right. In such a case, the output of the motor providing the assistance would be used in calculating the output of the assist mechanism. The accompanying drawings depict three-phase AC motors driving the power assist mechanism. The invention is not limited to three-phase motors, and other motors, including DC motors, single phase AC motors, and multi-phase motors may also be used, with the algorithm modified appropriately for a DC, a single phase AC or an AC motor with a specified number of phases.

Because of the importance of power steering in safely transporting people and cargo, it is important that if the power systems fail, they fail in a safe mode. With power steering systems, a safe mode is to shut off the assist mechanism. While this may make parking or low-speed steering more difficult, it is still safe, because high-speed maneuvers and driving typically need very little torque assist from the power steering system. These known parameters are meant to be included in the look-up tables or formulae used to decide whether the relationship between the driver steering effort and the power assist mechanism effort is appropriate. Accordingly, it is the intention of the applicants to protect all variations and modifications within the valid scope of the present invention. It is intended that the invention be defined by the following claims, including all equivalents. Since the foregoing detailed description has described only a few of the many alternative forms this invention can take, it is intended that only the following claims, including all equivalents, be regarded as a definition of this invention.

What is claimed is:

1. A power steering system for a vehicle, comprising:
   a steering system having an assist mechanism with at least one motor for power steering;
   a sensor for sensing at least one of a steering angle and a steering torque by a driver of the vehicle; and
   at least one controller for receiving inputs from the sensors and from the motor for calculating an output torque of the assist mechanism and for comparing said output with the steering torque,
   wherein the at least one controller uses an algorithm to calculate the output torque by the assist mechanism and determines whether a relationship between the steering wheel torque and the assist mechanism torque is within acceptable bounds; and
   wherein the at least one controller uses an algorithm for calculating motor assist torque, wherein torque equals $$sqrt(\tfrac{2}{3}) *Kt2*[I_a*\sin(\Theta)+I_b*\sin(\Theta-2\pi/3)+I_c*\sin(\Theta+2\pi/3)],$$

where Kt2 is a constant factor for a particular motor, $I_a$, $I_b$ and $I_c$ are motor phase currents, and $\Theta$ is a rotor mechanical angle times a number of pole pairs of the motor.

2. The power steering system of claim 1, further comprising a yaw sensor mounted on the vehicle, in sensible communication with the at least one controller, for sensing at least one of a yaw angle and a yaw rate.

3. The power steering system of claim 1, wherein the power steering motor is selected from the group consisting of a rack and pinion driving motor, ballscrew motor, hydraulic pump motor, and a motor connected for power steering through a clutch.

4. The power steering system of claim 1, wherein the at least one controller is selected from the group consisting of a microprocessor controller, an engine electronic controller, an electronic control unit, a digital signal processor, an application-specific integrated circuit (ASIC) and a discrete circuit.

5. The power steering system of claim 1, wherein the sensor measures at least one of a steering angle, a steering wheel torque, and a steering wheel rate of turn.

6. A method for controlling power steering, the method comprising:
   providing a power steering system for a vehicle selected from the group consisting of an automobile and a truck;
   measuring a steering torque by a driver of the vehicle;
   measuring an output torque of the power steering system using an algorithm, said measurement using an algorithm wherein torque equals:

$$sqrt(\tfrac{2}{3}) *Kt2*[I_a*\sin(\Theta)+I_b*\sin(\Theta-2\pi/3)+I_c*\sin(\Theta+2\pi/3)],$$

where Kt2 is a constant factor for a particular motor, $I_a$, $I_b$ and $I_c$ are motor phase currents, and $\theta$ is a rotor mechanical angle times a number of pole pairs of the motor;
   comparing the output torque of the power steering system with the steering torque by the driver; and
   adjusting the output of the power steering system if a relationship between the output torques does not meet specified criteria.

7. The method of claim 6, further comprising looking up an upper limit and a lower limit for a relationship between the outputs.

8. The method of claim 5, further comprising measuring at least one of a vehicle speed, a wheel speed, a yaw angle, a yaw rate, an acceleration rate, and a deceleration rate before the steps of comparing and adjusting.

9. The method of claim 6, wherein the step of comparing uses look-up tables made from boost curves.

10. The method of claim 9, wherein the motor is selected from the group consisting of a motor for a rack and pinion system, a ballscrew motor, a power steering hydraulic pump motor, and a motor connected for power steering through a clutch.

11. The method of claim 9, wherein the step of comparing further comprises qualifying the relationship between the output torques before adjusting the output of the power steering system.

12. A power steering system for a vehicle comprising:
    a steering system connected to two steered wheels of a vehicle selected from the group consisting of an automobile and a truck, said steering system having an assist mechanism for power steering using at least one motor;
    a sensor connected to a steering wheel in the steering system, the sensor capable of sensing a steering torque; and
    at least one controller receiving inputs from the sensor and the motor and running an algorithm for calculating an output of the assist mechanism, wherein the controller compares the output of the assist mechanism with the steering torque to determine whether a relationship between the output of the assist mechanism and the steering torque is appropriate for a desirable level of assistance, and wherein said algorithm for calculating an assist mechanism motor torque is, motor torque=sqrt($\frac{2}{3}$) *Kt2*[$I_a$* sin ($\Theta$)+$I_b$* sin ($\Theta-2\pi/3$)+$I_c$* sin ($\Theta+2\pi/3$)], where Kt2 is a constant factor for a particular motor, $I_a$, $I_b$ and $I_c$ are motor phase currents, and $\Theta$ is a motor mechanical angle times a number of pole pairs of the motor.

13. The power steering system of claim 12, further comprising a look-up table of values for finding minimum and maximum values of assist mechanism outputs for a given steering torque.

14. The power steering system of claim 12, further comprising a yaw sensor in sensible communication with the at least one controller for measuring at least one of a yaw angle and a yaw rate.

15. The power steering system of claim 12, wherein the power steering motor is selected from the group consisting of a rack and pinion driving motor, a ballscrew motor, a hydraulic pump motor, and a motor connected for power steering through a clutch.

16. The power steering system of claim 12, wherein the controller is selected from the group consisting of a microprocessor controller, an engine electronic controller, an electronic control unit, a digital signal processor, an application-specific integrated circuit (ASIC) and a discrete circuit.

17. A power steering system for a vehicle comprising:

a steering system connected to two steered wheels of a vehicle, said steering system having a power assist mechanism with a motor;

a sensor connected to a steering wheel in the steering system for sensing a steering torque; and at least one controller receiving inputs from the sensor and the motor and running an algorithm for calculating an output of the assist mechanism, wherein the controller compares the output of the assist mechanism with the steering torque to determine whether a relationship between the output of the assist mechanism and the steering torque is appropriate for a desired level or assistance, and wherein said algorithm for calculating an assist motor torque uses the equation where torque equals $$sqrt(\tfrac{2}{3}) *Kt2*[I_a*\sin(\Theta)+I_b*\sin(\Theta-2\pi/3)+I_c*\sin(\Theta+2\pi/3)],$$

where Kt2 is a constant factor for a particular motor, $I_a$, $I_b$ and $I_c$ are motor phase currents, $\Theta$ is a motor mechanical angle times a number of pole pairs of the motor.

18. The power steering system of claim 17, wherein the motor is selected from the group consisting of a rack and pinion driving motor, ballscrew motor, a hydraulic pump motor, and a motor connected for power steering througha clutch.

* * * * *